(12) United States Patent
Kalisz

(10) Patent No.: US 8,328,233 B2
(45) Date of Patent: Dec. 11, 2012

(54) ACTIVE BOLSTER WITH ACTIVE VENTING

(75) Inventor: Raymond E. Kalisz, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 13/076,737

(22) Filed: Mar. 31, 2011

(65) Prior Publication Data

US 2012/0248742 A1    Oct. 4, 2012

(51) Int. Cl.
*B60R 21/276* (2006.01)

(52) U.S. Cl. ..................... 280/739; 280/730.1

(58) Field of Classification Search .......... 280/739, 280/730.1, 728.3, 743.1
See application file for complete search history.

(56) References Cited

U.S. PATENT DOCUMENTS

| | | | |
|---|---|---|---|
| 3,245,428 A * | 4/1966 | Klimak et al. | 137/493 |
| 3,724,179 A * | 4/1973 | Leinfelt | 55/367 |
| 4,805,930 A * | 2/1989 | Takada | 280/739 |
| 5,007,662 A * | 4/1991 | Abramczyk et al. | 280/739 |
| 5,219,179 A * | 6/1993 | Eyrainer et al. | 280/739 |
| 5,310,215 A | 5/1994 | Wallner | |
| 5,456,490 A * | 10/1995 | Carter et al. | 280/728.3 |
| 5,533,748 A * | 7/1996 | Wirt et al. | 280/728.3 |
| 5,704,639 A * | 1/1998 | Cundill et al. | 280/739 |
| 5,725,244 A | 3/1998 | Cundill | |
| 5,839,755 A * | 11/1998 | Turnbull | 280/739 |
| 6,017,057 A | 1/2000 | O'Docherty | |
| 6,032,978 A | 3/2000 | Spencer et al. | |
| 6,203,057 B1 | 3/2001 | Spencer et al. | |
| 6,213,497 B1 | 4/2001 | Spencer et al. | |
| 6,322,100 B1 * | 11/2001 | Cuevas et al. | 280/728.3 |
| 6,517,108 B1 * | 2/2003 | Vinton et al. | 280/739 |
| 6,726,242 B2 * | 4/2004 | Moon | 280/739 |
| 6,758,493 B2 | 7/2004 | Conlee et al. | |
| 7,469,926 B2 | 12/2008 | Lewis et al. | |
| 7,540,533 B2 * | 6/2009 | Kai et al. | 280/739 |

(Continued)

FOREIGN PATENT DOCUMENTS

WO    WO200711787 A1    10/2007

OTHER PUBLICATIONS

Raj S. Roychoudhury et al., Blow-Molded Plastic Active Knee Bolsters, SAE Technical Paper Series 2004-01-0844, Mar. 8-11, 2004, pp. 1-9.

(Continued)

*Primary Examiner* — Drew Brown
(74) *Attorney, Agent, or Firm* — Raymond L. Coppiellie; MacMillan, Sobanski & Todd, LLC

(57) ABSTRACT

An active bolster for an automotive vehicle includes a bladder that inflates an interior trim area of the vehicle to provide a cushion to an occupant during a crash. The bladder has a front panel and a back panel joined to the front panel defining an inflatable cavity. The back panel has a variable vent for venting inflation gas supplied into the cavity during a crash event. The vent has a first predetermined flow coefficient when a pressure difference across the vent is substantially zero and a greater flow coefficient when there is a predetermined pressure difference across the vent. Little gas is lost during an inflation phase while sufficient venting is obtained during an impact phase.

10 Claims, 3 Drawing Sheets

U.S. PATENT DOCUMENTS

| | | | |
|---|---|---|---|
| 7,607,681 B2* | 10/2009 | Okada et al. | 280/728.3 |
| 7,828,325 B2* | 11/2010 | Pittiglio et al. | 280/739 |
| 2002/0140216 A1* | 10/2002 | Kobayashi et al. | 280/739 |
| 2005/0098996 A1* | 5/2005 | Enders | 280/751 |
| 2008/0164681 A1 | 7/2008 | Nuthalapati | |
| 2009/0152848 A1 | 6/2009 | Sadr et al. | |
| 2009/0152849 A1 | 6/2009 | Saraf et al. | |
| 2009/0284041 A1 | 11/2009 | Hall et al. | |
| 2010/0207370 A1 | 8/2010 | Haba et al. | |
| 2010/0326782 A1 | 12/2010 | VandenBerge et al. | |

OTHER PUBLICATIONS

Bijoy K Saraf, et al., Active Bolster for Side Impact Protection, SAE Technical Paper Series 2008-01-0191, Apr. 14-17, 2008, pp. 1-11.

* cited by examiner

ACTIVE BOLSTER WITH ACTIVE VENTING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to venting a bladder in a manner that reduces the volume of gas needed while maintaining proper impact response.

An active bolster is a vehicle occupant protection device with a gas-inflatable bladder to absorb impacts and reduce trauma to occupants during a crash. As opposed to deploying air bag cushions through various openings, active bolsters use the interior trim surface itself to expand at the beginning of a crash event for absorbing the impact and dissipating energy through the action of an inflation gas. Pending application U.S. Ser. No. 12/824,150, filed Jun. 26, 2010, incorporated herein by reference, discloses an active knee bolster integrated into a glove box door that is light weight and visually attractive.

In a typical structure, an active bolster includes a front wall or panel that faces a vehicle occupant and is attached to a base wall or panel along a sealed periphery. The walls are typically made of molded plastic with an accordion portion that straightens during deployment, thereby providing an inflatable bladder. The peripheral seal is formed by hot welding, for example.

It is known that in order to optimize the dissipation of energy when an occupant contacts an air bag, inflation gas should be vented to allow a controlled collapse of the airbag that decelerates the impacting occupant safely. Some conventional airbags have utilized vents that only open in response to pressure within the airbag reaching a predetermined threshold. In the case of an active bolster employing a bladder formed by molded plastic panels, it is desirable to vent the inflatable bladder at all times to maintain it at substantially atmospheric pressure during non-crash conditions. Otherwise, noticeable deformation of the interior trim component incorporating the active bolster may occur during temperature extremes since the panel materials are relatively flexible. Furthermore, it is desirable to avoid the use of costly, complicated vent valves of the types known in the prior art.

Prior art bolsters have employed drilled vent holes in the plastic panel in order to provide a constant venting capacity. The venting capacity designed into a bolster has been determined by the amount of venting that is desired during the impact phase when an occupant strikes the bolster. In conventional venting, the inflation gas is metered out of the inflatable bladder at a rate that optimizes the occupant deceleration during a crash phase (even though excessive loss of gas may occur during the inflation phase).

The loss of gas through the vent during initial filling of the bladder results in the need for a greater output capacity of the inflation gas source. This results in an increase in cost and size of the inflator. Reducing vent size to allow use of a smaller, less costly inflator would not only reduces energy absorption during impact, but may also result in failure of the peripheral weld of the bladder due to the higher pressures inside the bladder.

SUMMARY OF THE INVENTION

In one aspect of the invention, an active bolster has a bladder with a deployment side and a bearing side defining an internal cavity. A gas source is coupled to the bladder for supplying inflation gas into the internal cavity during a deployment to expand the bladder. The bladder includes a variable vent for venting inflation gas, the vent having a first predetermined flow coefficient when a pressure difference across the vent is substantially zero and a greater flow coefficient when there is a predetermined pressure difference across the vent.

DETAILED DESCRIPTION OF PREFERRED EMBODIMENTS

Figure 1:
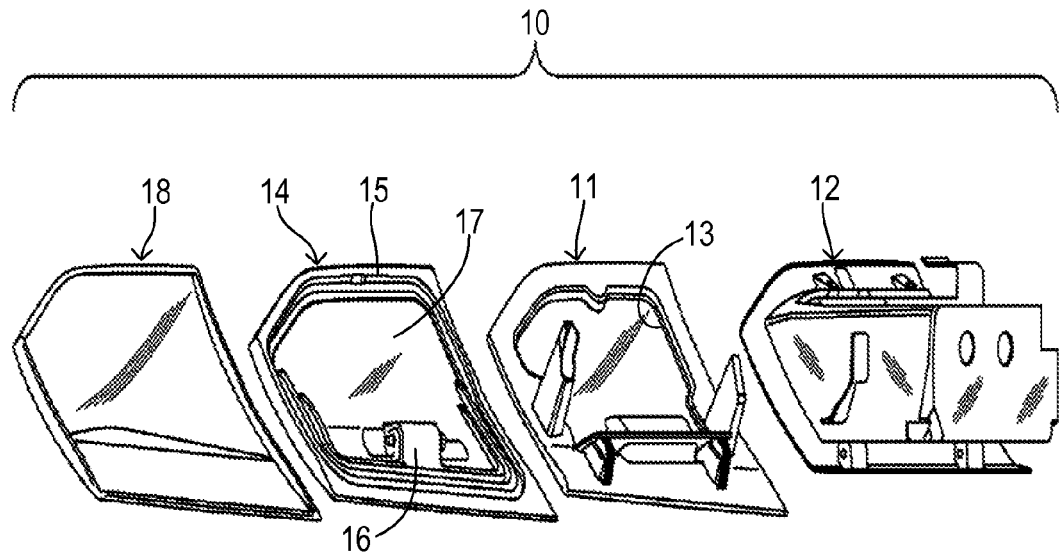
FIG. 1 is a is an outward-looking, exploded perspective view of an active knee bolster glove box door system of a type to which the present invention can be applied.

Referring now to FIG. 1, a prior art active knee bolster system 10 has a base panel component 11 which forms the foundation for the bolster. Base 11 may be either attached to the vehicle by hinging from a storage cavity or glove box 12 as shown in FIG. 1, or mounted to another structure such as an instrument panel support below a steering column, for example. Such locations are accessible to the knees of an individual riding in a corresponding seating position within a vehicle.

Base 11 has a periphery 13 adapted to be sealed to a front panel component 14 having a matching periphery 15. Base 15 and front 14 are preferably comprised of molded plastics and may be joined by plastic welding, such as hot plate welding, to form a peripheral seal around an interior open space 17 for forming a bladder. An inflation gas source 16 is electronically controlled for activating during a crash event to release gas to inflate the bolster. Front 14 may comprise the interior trim surface (e.g., the outside of the glove box door), or an additional skin 18 can be applied to the outer surface (i.e., Class A surface) of front panel 14. Skin 18 is preferably constructed of plastic and may be a vacuum-formed thermoplastic bilaminate that may be grained or otherwise finished.

Figure 2:
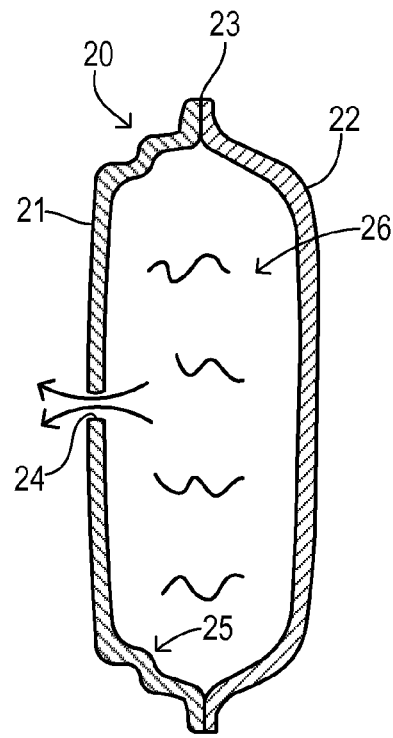
FIG. 2 is a cross section of a bladder during an initial phase of inflation.
Figure 3:
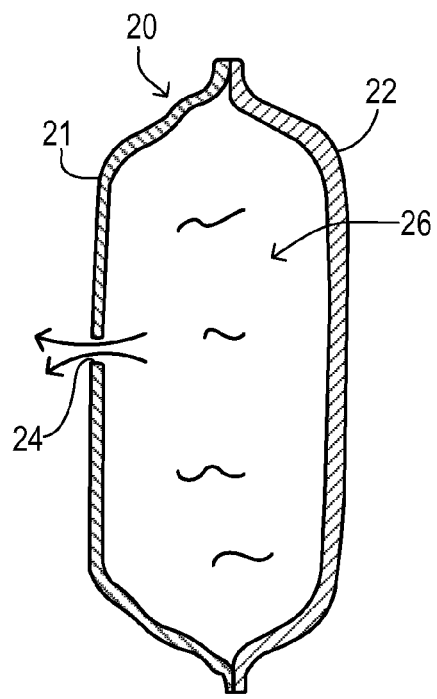
FIG. 3 is a cross section of a bladder near maximum inflation.

FIG. 2 shows an active bolster having an inflatable bladder 20 comprising a rear wall or panel 21 on a bearing side and a front wall or panel 22 on a deployment side. Walls 21 and 22 are hot welded together around their periphery at a seal 23. Rear wall 21 has a vent 24 and an accordion section 25 that straightens during inflation as shown in FIG. 3. An inflation gas 26 is released by an inflator (not shown) that expands bladder 20 while gas is vented through vent 24.

Figure 4:
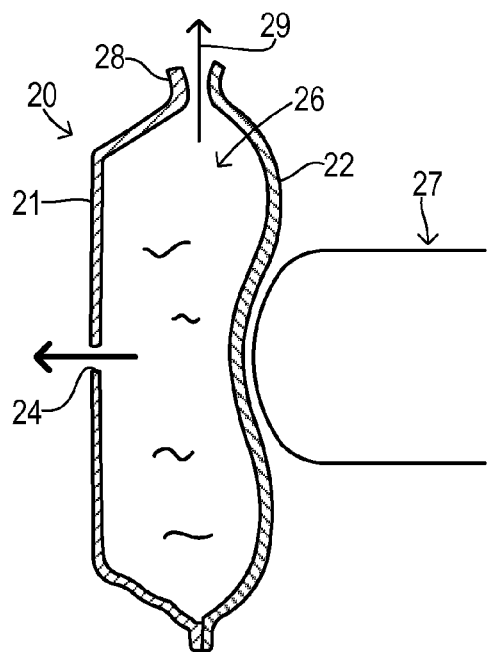
FIG. 4 is a cross section of an inflated bladder being impacted by an occupant.

FIG. 4 shows an occupant's knee 27 impacting front panel 22 on its deployment side causing panel 22 to deform. The impact tends to increase the pressure of gas 26 in the bladder, resulting in an increased flow through vent 24. Vent 24 has a fixed cross-sectional size, which provides a constant flow coefficient. The increased pressure, however, may cause a rupture 28 in the peripheral seam resulting in gas escape at 29. If the size of rupture 28 is large enough, gas is vented so quickly that cushioning is lost and the impacting object is no longer prevented from striking the support structure behind the bolster's bearing side. Thus, the fixed flow coefficient vent of the prior art is a compromise between inflator capacity and energy absorption performance.

Figure 5:
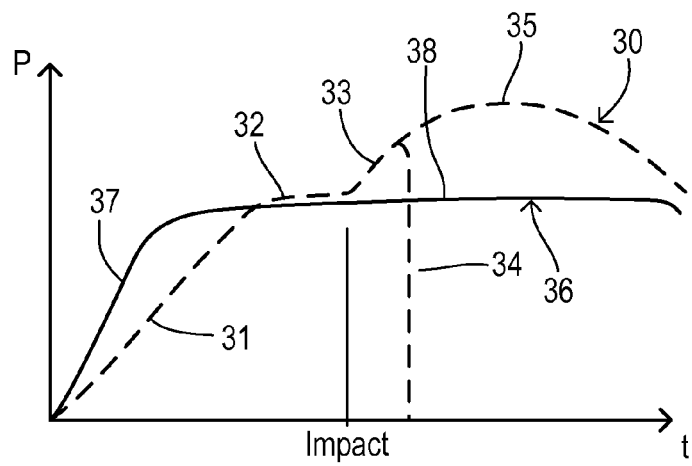
FIG. 5 is a graph comparing bladder pressure versus time for the prior art and the present invention.

A dashed line 30 in FIG. 5 represents internal bladder pressure during deployment with a prior art fixed vent (e.g., drilled holes providing a constant flow cross section). At 31, gas from a relatively large inflator builds pressure as the bladder expands. Due to the relatively large flow cross section, a more gradual filling of the bladder occurs. After the bladder has expanded and gas supplied by the inflator slows, the pressure levels off at 32. Upon impact of an object at the impact time as indicated, bladder pressure increases at 33. In the event of a catastrophic failure of the peripheral seal, pressure quickly drops back to atmospheric as shown at 34. If the seal does not fail, pressure may further increase and then level off and/or decrease as shown at 35 during and after the impact. The pressure may increase higher than an optimum pressure if the fixed vent is made slightly undersized in order to try to reduce excessive loss of inflation gas during the initial filling. The higher pressure results in a harder impact to the occupant, with a less even deceleration.

FIG. 5 shows an active venting line 36 as achieved by the present invention. By providing a vent having a variable flow coefficient, a faster initial pressure increase with the vent at a low flow coefficient is achieved as shown at 37. Thus, a fast filling of the bladder is obtained without requiring a large inflator capacity. The bladder becomes fully loaded and the pressure levels off sooner than for the fixed vent. At the point in time when an impact occurs (thereby causing bladder pressure to raise above a particular threshold), the flow coefficient of the vent increases so that the actual pressure increase in the bladder is less than it is for the fixed vent, as shown at 38. As a result of the active response of the vent, the pressure remains substantially constant regardless of the impacting occupant. Therefore, a more beneficial deceleration of the occupant is obtained.

Figure 6:
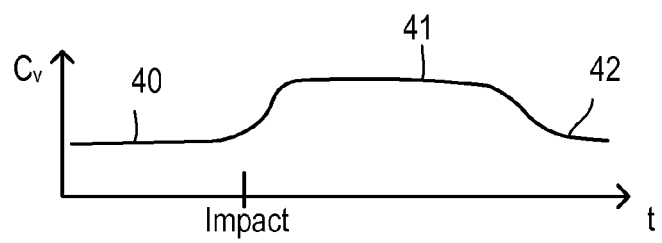
FIG. 6 is a graph showing the changing flow coefficient of the invention.

FIG. 6 illustrates a flow coefficient $C_V$ having a first predetermined value at 40 which increases upon impact to a greater value and reaches a peak at 41. After absorbing the impact and depleting the inflation gas, the flow coefficient may reduce to its first predetermined value at 42.

Figure 7:
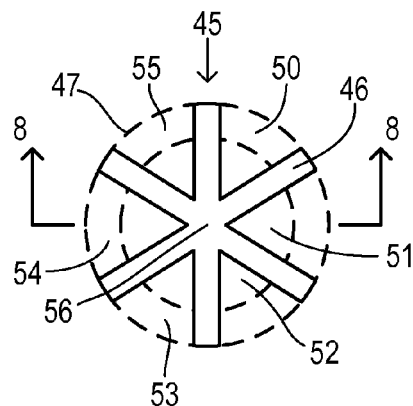
FIG. 7 is a plan view of one preferred embodiment of an active vent of the present invention.

One preferred embodiment of the invention is shown in FIG. 7. A variable vent 45 is formed in the back panel of the inflatable bladder on the bearing side (i.e., the side that bears against the fixed structure of the vehicle such as the frame of an instrument panel, glove box door, or vehicle door). Variable vent 45 is comprised of an opening that continuously vents the internal cavity of the inflatable bladder to the interior of the passenger cabin of the vehicle. Variable vent 45 includes a plurality of substantially planar, bendable members 50-55 (i.e., flaps) extending from an outer periphery 47 of vent 45 toward an open center 56 with a gap 46 between each adjacent bendable member 50-55. Center 56 and gap 46 provide a total cross sectional area that creates a first predetermined flow coefficient through variable vent 45.

Figure 8:
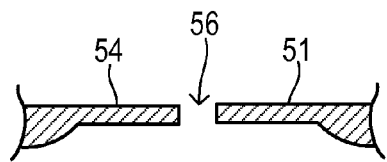
FIG. 8 is a cross section taken along line 8-8 of FIG. 7 with the vent in its position for lowest flow coefficient.
Figure 9:
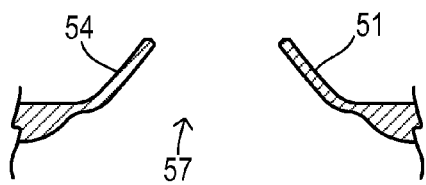
FIG. 9 is a cross section similar to FIG. 8 with the vent in its position for a higher flow coefficient.
Figure 10:
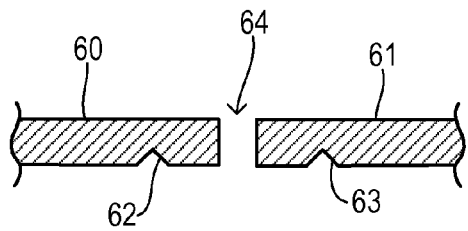
FIGS. 10 and 11 are cross sections showing an alternative embodiment with the vent in its low flow coefficient and high flow coefficient positions, respectively.
Figure 11:
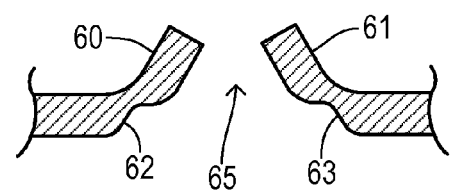

Under normal conditions (i.e., with zero pressure difference across the vent), each member or flap 50-55 lies substantially flat as shown in FIG. 8. In the unbent condition, the flow coefficient $C_v$ depends only on the flow cross-section between members 50-55 and center area 56. When the pressure difference across vent 45 exceeds a predetermined value (which depends upon the strength of bendable members 50-55), the members are deflected upward as shown in FIG. 9. A larger flow cross section 57 is produced when the bendable members are deflected upward, thereby creating a greater flow coefficient to allow the exhaustion of a greater volume of inflation gas through vent 45 when the pressure difference across the vent is greater than or equal to a predetermined pressure difference. The predetermined pressure at which the flow coefficient starts to increase is determined by the flexibility of each planar, bendable member. Each member is made bendable by providing a local reduction in the thickness of each flap. Alternatively, a seam or notch can provide a bendable hinge on each flap as shown in FIG. 10. Thus, flaps 60 and 61 have seams 62 and 63 providing a reduced thickness so that each flap can bend upward as shown in FIG. 11. A flow cross section 64 prior to bending as shown in FIG. 10 grows to a larger flow cross section 65 shown in FIG. 11, thereby providing a greater flow coefficient. Preferably, the flow coefficient is proportional to the pressure difference across the vent for a range of pressure differences above the predetermined pressure difference. In a harder impact which causes an even greater increase in bladder pressure, the flow coefficient rises even higher to relieve the pressure.

Figure 12:
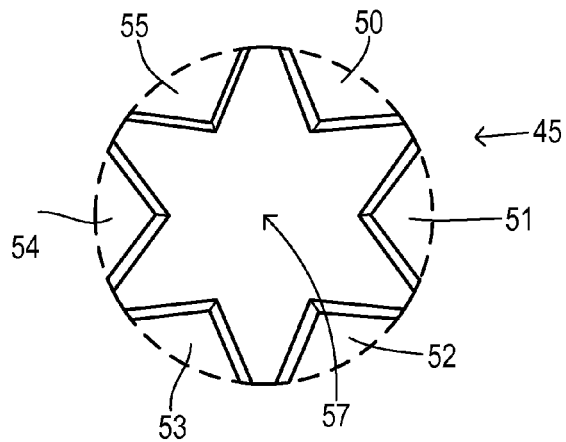
FIG. 12 is a plan view of the vent of FIG. 7 with the bendable members deflected into high flow coefficient positions.

The increased flow cross section can be seen by comparing FIG. 12 (wherein each flap is in a bent position) with FIG. 7 (wherein each flap is in its flat position). The increased flow cross section of FIG. 12 provides a greater flow coefficient to allow active control of venting and improved crash performance at lower cost.

What is claimed is:

1. An active bolster comprising:
   a bladder having a deployment side and a bearing side defining an internal cavity, wherein the bladder is comprised of molded plastic walls joined at a matching periphery by plastic welding; and
   a gas source coupled to the bladder for supplying inflation gas into the internal cavity during a deployment to expand the bladder;
   wherein the bladder includes a variable vent formed in one of the molded plastic walls for venting inflation gas, the vent having a first predetermined flow coefficient when a pressure difference across the vent is substantially zero and a greater flow coefficient when there is at least a predetermined pressure difference across the vent.

2. The bolster of claim 1 wherein the vent has a flow coefficient that is proportional to the pressure difference across the vent for a range of pressure differences above the predetermined pressure difference.

3. The bolster of claim 1 wherein the vent comprises a plurality of substantially planar, bendable members formed in the one of the molded plastic walls and extending from a periphery of the vent toward an open center within the vent.

4. The bolster of claim 3 wherein the vent is integrated into the bearing side, wherein the bearing side adjacent the periphery of the vent has a first thickness, and wherein the bendable members each has a respective thickness less than the first thickness.

5. The bolster of claim 4 wherein one or more of the bendable members includes an undercut notch to act as a hinge.

6. The bolster of claim 3 wherein the vent has an initial cross-sectional flow area when the pressure difference across the vent is substantially zero, and wherein the cross-sectional flow area increases as the bendable members bend from forces resulting from the pressure difference across the vent.

7. The bolster of claim 1 wherein the bladder is installed in an interior trim piece of an automotive vehicle to provide an active knee bolster.

8. The bolster of claim 7 wherein the interior trim piece is a glove box door.

9. A method of actively venting an active bolster in a vehicle, wherein the bolster includes a bladder having a deployment side and a bearing side defining an internal cavity for receiving inflation gas from a gas source during a crash event of the vehicle, and wherein the bladder is comprised of molded plastic walls joined at a matching periphery by plastic welding, the method comprising the steps of:
    configuring a vent in the bladder to provide a first predetermined flow coefficient when a pressure difference across the vent is substantially zero, wherein the vent is formed in one of the molded plastic walls;
    initiating a delivery of the inflation gas into the bladder in response to the crash event, wherein the inflation gas flows out of the vent according to the first predetermined flow coefficient during the initial delivery of inflation gas to inflate the bladder; and
    venting the inflation gas out of the vent at a greater flow coefficient when a pressure difference across the vent rises to a predetermined pressure difference.

10. The method of claim 9 wherein the step of venting at a greater flow coefficient is comprised of venting at a flow coefficient that is proportional to the pressure difference across the vent for a range of pressure differences above the predetermined pressure difference.

* * * * *